US006289848B1

United States Patent
Estevez et al.

(10) Patent No.: US 6,289,848 B1
(45) Date of Patent: Sep. 18, 2001

(54) METHOD AND DEVICE FOR DISTRIBUTING FOWL WITHIN AN ENCLOSURE

(75) Inventors: Immaculada Estevez, Laurel, MD (US); Ruth C. Newberry, Pullman, WA (US)

(73) Assignee: University of Maryland, College Park, MD (US)

( * ) Notice: Subject to any disclaimer, the term of this patent is extended or adjusted under 35 U.S.C. 154(b) by 0 days.

(21) Appl. No.: 09/416,942

(22) Filed: Oct. 13, 1999

Related U.S. Application Data

(60) Provisional application No. 60/103,924, filed on Oct. 13, 1998.

(51) Int. Cl.⁷ .................................................. A01K 31/18

(52) U.S. Cl. ............................ 119/473; 119/412; 119/472

(58) Field of Search .................................. 116/473, 472, 116/469, 437, 412, 434, 435

(56) References Cited

U.S. PATENT DOCUMENTS

| 429,196 | * | 6/1890 | Leonard . | |
|---|---|---|---|---|
| 862,659 | * | 8/1907 | Richards . | |
| 1,185,578 | * | 5/1916 | Barnes . | |
| 1,227,401 | * | 5/1917 | Drake . | |
| 1,238,349 | * | 8/1917 | Shreve . | |
| 1,772,814 | * | 8/1930 | Laycock . | |
| 1,802,579 | * | 4/1931 | Scott . | |
| 2,346,001 | * | 4/1944 | Bate . | |
| 4,648,351 | * | 3/1987 | Lanner et al. | 119/480 |
| 5,233,939 | * | 8/1993 | Randolph | 119/473 |

* cited by examiner

Primary Examiner—Charles T. Jordan
Assistant Examiner—Yvonne R. Abbott
(74) Attorney, Agent, or Firm—Dykema Gossett PLLC

(57) ABSTRACT

A fowl attraction device for causing fowl to be distributed within an enclosure includes a support stand for placement in or on the ground or flooring surface within the enclosure and a mesh screen attached to the support stand to be generally vertically oriented. Fowl will be attracted to the attraction device, so one or more attraction devices are placed within the enclosure to for example move fowl inwardly of outer walls of the enclosure.

19 Claims, 1 Drawing Sheet

METHOD AND DEVICE FOR DISTRIBUTING FOWL WITHIN AN ENCLOSURE

This application claims the benefit of U.S. Provisional Application Ser. No. 60/103,924, filed Oct. 13, 1998.

BACKGROUND OF THE INVENTION

1. Field of the Invention

The present invention relates to animal husbandry, and in particular to the housing and raising of fowl.

2. The Prior Art

Most fowl raised for human consumption, e.g., chickens and turkeys, as well as breeders for the production of chicks, are housed in large enclosures, commonly called poultry houses. These poultry houses normally include outer walls and a roof, and either solid flooring, slatted flooring, or combinations thereof. Nesting boxes, perches and feeding devices are often, although not always, located within these poultry houses. On the other hand, some fowl are raised in outdoor areas that are enclosed only with fencing (free-range fowl).

Unfortunately, instead of spreading out in a distributed manner throughout a poultry house or within an enclosed outdoor area, fowl tend to congregate near the limiting walls, leaving other interior areas sparsely populated. This creates many problems:

When birds are crowded together and their resting and active cycles are not synchronized, and resting birds will be frequently disturbed by active birds. This will cause psychological stress in the birds attempting to rest, resulting in inadequate sleep and possible immunosuppression and increased susceptibility to disease.

When crowded together, birds will be at increased risk of stepping on one another, causing skin scratches. This can lead to infection, which in turn can lead to downgrading or condemnation of the carcasses due to cellulitis, and sometimes death of the birds.

Birds congregating at the periphery of the poultry house will result not only in inefficient use of available space, but in high concentration of droppings and reduced litter quality in these areas. Wet and caked litter with high nitrogen content from those droppings will cause skin lesions, especially on heavy poultry reared for meat (broiler chickens, turkeys). Skin lesions include breast blister and hock burns. These lesions must be trimmed at the processing plant, resulting in downgrading and loss of product.

In hot weather, birds that are crowded together around the periphery of the poultry house will have difficulty in thermoregulating, resulting in discomfort, physiological stress response, immunosuppression (increased susceptibility to disease), reduced feed intake, reduced growth ratio (in young birds), reduced egg production (adult females), and death in severe situations.

Birds located in the less populated areas of the poultry house, and lacking nearby cover, are at increased risk of injury from feather-pecking birds, cannibalistic birds and aggressive birds. Such birds are also at increased risk of predation by arial and ground predators. They are less likely to go outside and consume green forage.

Lack of hiding places in a poultry house for breeding fowl causes females to be afraid to enter areas with high concentrations of males. The females who do enter these areas are mated in a rough manner by the large number of competing males. The females become injured by scratches and pecks from the males, possibly causing death. The females are subsequently nervous and less likely to enter the male areas for mating.

If hysteria in the birds occurs, e.g., due to the occurrence of sudden noises or other unusual stimuli, a majority of the birds will pack together at an end wall of the poultry house and large numbers will die from asphyxiation.

A method of causing fowl such as chickens, turkeys, hens and breeders to relocate within a poultry house, or in an outdoor enclosure, and in particular a method of causing fowl to move away from the periphery of a poultry enclosure, and inwardly thereof, such that the birds will be more evenly distributed throughout the poultry enclosure, thus reducing the consequences of nervousness and even hysteria in the birds, is desired.

SUMMARY OF THE INVENTION

We have discovered that it is possible to cause fowl to distribute themselves more evenly within an enclosure, whether covered or not, by positioning static attraction devices throughout the enclosure, these attraction devices including a vertically oriented mesh screen. We have found that fowl, and in particular chickens, will naturally migrate towards these attraction devices and away from the outer walls of the enclosure.

These fowl attraction devices provide vertical cover that instills a sense of security (safety) in the birds. They become less fearful and less likely to be injured or killed by other birds. They become more evenly distributed within the house (or free range areas), resulting in dilution of the manure over a greater area, less damage to vegetation in free range areas, improved litter and air quality in the house, and less risk of heat stress during hot weather. Breeding females readily join males in areas with vertical cover, resulting in reduced competition among males, proper expression of courtship behavior by males towards females, a reduced risk of scratching and injury of females during copulation, reduced fearfulness in females, and increased numbers of fertile eggs. When an area of a poultry house that has previously been closed to the birds is opened up, placement of fowl attraction devices in the new area will increase the speed at which the birds spread out into the new area (e.g., when broiler chickens are given access to the whole house after being confined to a smaller area for brooding, when turkeys are moved from a brooding area to a growing area, when birds are given access to a free range area for the first time). Reduced crowding has the benefits described above.

The inventive fowl attraction devices are porous for improved ventilation, they provide partial cover but still allow birds to monitor events on the other side when close to the cover, they are short in length so that they do not substantially block movement of birds (resulting in reduced access to feeders and drinkers and therefore, reduced productivity), they are provided in sufficient numbers to produce a more even distribution of birds throughout the house, and they are preferably constructed of lightweight, easily sanitizable, durable (birds cannot remove pieces of the panels by pecking or scratching), non-toxic and smooth materials (no splinters or sharp edges) for ease of raising or removal prior to catching and removal of birds from the house, ease of cleaning and sanitizing before the next flock, and avoidance of harm to birds, poultry caretakers and consumers of poultry products.

The invention will be better understood by reference to the accompanying drawings, taken in conjunction with the following discussion.

DETAILED DESCRIPTION OF THE PREFERRED EMBODIMENTS

Figure 1:
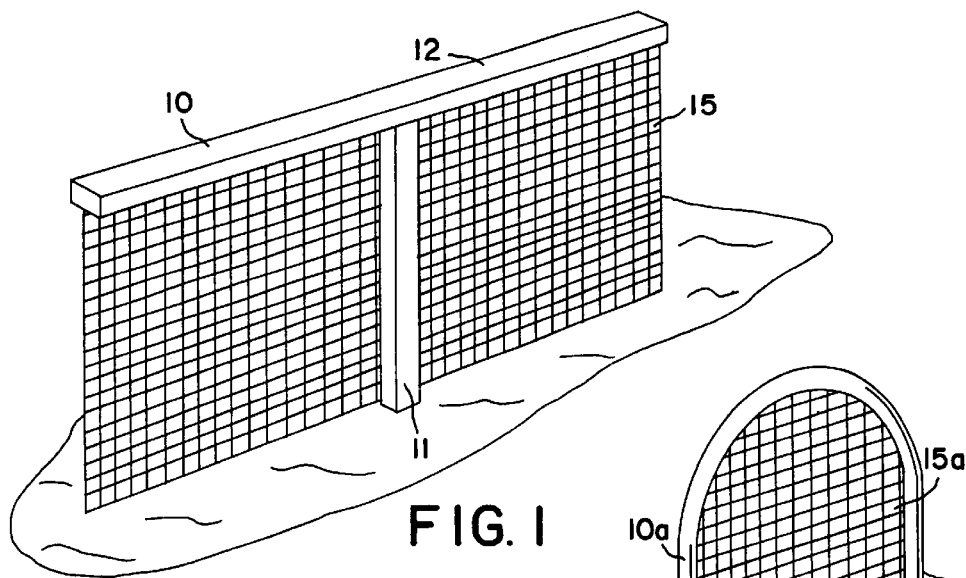
FIG. 1 shows a perspective view of a fowl attraction device in accordance with a first embodiment of the present invention.

FIG. 1 shows a fowl attraction device according to a first embodiment of the present invention. It includes a T-shaped support stand 10 formed of a vertical element 11 and a horizontal cross-element 12 connected to the top of element 11. A rectangular mesh screen 15 is attached to cross-element 12 so as to hang generally vertically down to (or near) the flooring or ground surface in which the vertical element 11 extends. It can be also attached to the vertical element 11. The elements 11 and 12 are depicted as having a rectangular cross-section; however, they can alternatively have a circular cross-section if desired. These elements can be made of plastic, metal or wood. The screen 15 can be made of plastic, metal, rope, fabric or other suitable material. It has been found that when the attraction device is placed within an enclosure, e.g., in the ground or flooring of a poultry house or pen, or within the fencing of an outdoor area, chickens and turkeys will naturally congregate around it. The screen 15 not only acts as an attractant, but because it is porous, allows the free flow of air therethrough.

Figure 2:
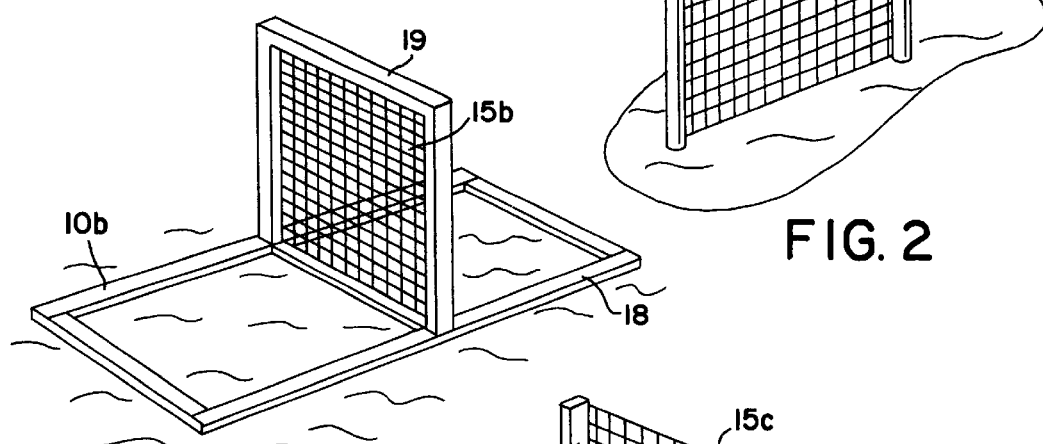
FIG. 2 shows a perspective view of a fowl attraction device according to a second embodiment of the present invention.

FIG. 2 shows a second embodiment of a fowl attraction device according to the invention. In this case the support stand 10a is arch-shaped, the two opposite ends thereof being placed in the ground or flooring surface of the enclosure, and the screen 15a is attached to the arch so as to hang vertically downwardly to (or near) the flooring or ground surface. The support stand 10a and mesh screen 15a can be made of the same materials and can have the same variety of cross-sections as in the FIG. 1 embodiment.

Figure 3:
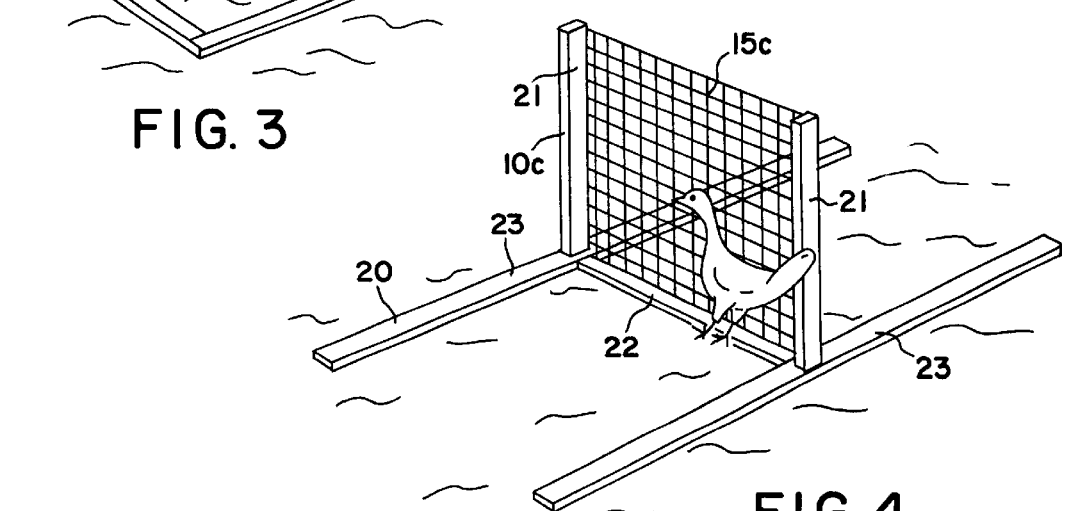
FIG. 3 shows a perspective view of a fowl attraction device according to a third embodiment of the present invention.

FIG. 3 shows a third embodiment wherein the support stand 10b includes a rectangular base 18 for positioning on the ground or flooring surface within the enclosure, and a frame 19 which extends vertically upwardly from the base 18 and which mounts a mesh screen 15b therewithin.

Figure 4:
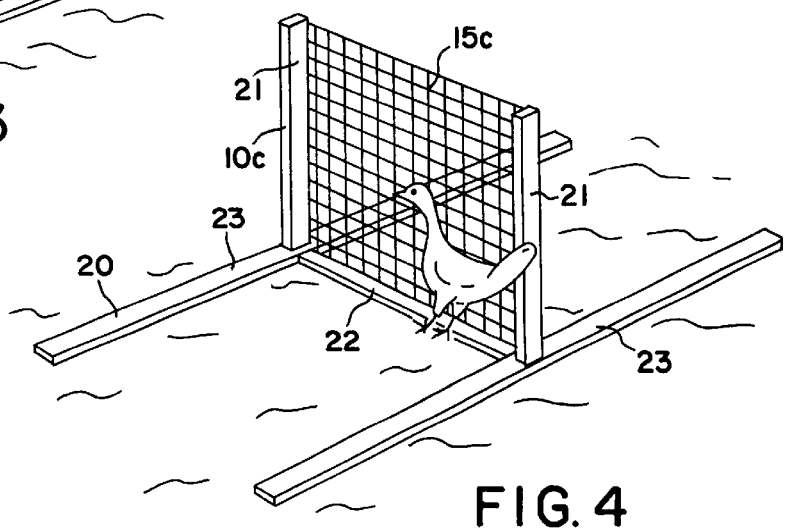
FIG. 4 shows a perspective view of a fowl attraction device according to a fourth embodiment of the present invention.

FIG. 4 shows a fourth embodiment wherein the support stand 10c includes an H-shaped base 20 and separate support elements 21 which extend upwardly from the H-shaped base 23, where the cross member 22 respectively meets the parallel base members 23. These vertical support elements support a mesh screen 15c therebetween.

Although certain embodiments of the invention have been shown and described in detail, modifications can be made therein and still fall within the scope of the appended claims.

We claim:

1. A combination of an enclosure for fowl and a separate fowl attraction device for use in creating a better distribution of fowl within the enclosure, such device comprising a support stand which is movably positioned within and not connected to the enclosure and a mesh screen attached to said support stand so as to be generally vertically oriented relative to a ground or flooring surface.

2. The combination according to claim 1, wherein said support stand comprises a first element which is insertable in the ground or flooring surface to extend vertically upwardly therefrom and a second element which is attached to an upper end of the first element and which extends perpendicular thereto, said mesh screen being attached to said second element to hang downwardly therefrom.

3. The combination according to claim 1, wherein said support stand comprises a base which is positionable on the ground or flooring surface and a frame which extends vertically upwardly from said base, said mesh screen being connected within said frame.

4. The combination according to claim 3, wherein said mesh screen is made of fabric.

5. The combination according to claim 1, wherein said support stand is made of plastic.

6. The combination according to claim 1, wherein said support stand is made of metal.

7. The combination according to claim 1, wherein said support stand is made of wood.

8. The combination according to claim 1, wherein said mesh screen is made of plastic.

9. The combination according to claim 1, wherein said mesh screen is made of metal.

10. The fowl attraction device for use in creating a better distribution of fowl within an enclosure, said device comprising a support stand which is positionable within the enclosure and which includes an arch-shaped element, and a mesh screen extending within the arch-shaped element.

11. The fowl attraction device for use in creating a better distribution of fowl within an enclosure, said device comprising a support stand which is positionable within the enclosure and which includes an H-shaped base and separate vertical support elements extending upwardly from said H-shaped base, and a mesh screen supported between said vertical support elements so as to be generally vertically oriented relative to a around of flooring surface.

12. A method of distributing fowl within an enclosure having outer retaining means, said method comprising the steps of (1) providing a fowl attraction device in the form of a support stand which supports a generally vertically-oriented member, and (2) placing said fowl attraction device within said enclosure so as to attract said fowl thereto, said fowl attraction device being movable within and unconnected to said enclosure.

13. A method according to claim 12, comprising placing a plurality of said fowl attraction devices in spaced fashion within said enclosure.

14. A method according to claim 12, wherein said enclosure is a poultry house.

15. A method according to claim 12, wherein said enclosure is provided by outdoor fencing.

16. A method of reducing psychological stress in fowl contained within an enclosure which comprising the steps of (1) providing a fowl attraction device in the form of a support stand which supports a generally vertically-oriented member, and (2) placing said fowl attraction device within said enclosure so as to attract fowl thereto and away from crowded areas therein, said fowl attraction device being movable within and unconnected to said enclosure.

17. A method according to claim 16, comprising placing a plurality of said fowl attraction devices in spaced fashion within said enclosure.

18. A method according to claim 16, wherein said enclosure is a poultry house.

19. A method according to claim 16, wherein said enclosure is provided by outdoor fencing.

* * * * *